United States Patent [19]

Wu et al.

[11] Patent Number: 5,785,263

[45] Date of Patent: Jul. 28, 1998

[54] WASTE TIRE PULVERIZING AND SEPARATION APPARATUS

[76] Inventors: Chun-Feng Wu; Shih-Hsu Wu, both of No. 148 Hou-pi-liao, Hou-po-tsun, Hou-pi-hsiang, Tainan Hsien, Taiwan

[21] Appl. No.: 871,886

[22] Filed: Jun. 9, 1997

[51] Int. Cl.$^6$ .................. B02C 13/02; B02C 23/08
[52] U.S. Cl. .............. 241/79.1; 241/185.5; 241/186.2; 241/189.1; 241/191; 241/281; 241/294; 241/DIG. 31
[58] Field of Search ................. 241/79.1, 185.5, 241/186.2, 189.1, 191, 197, 293, 294, 300, DIG. 31, 280, 281

[56] References Cited

U.S. PATENT DOCUMENTS

| | | | |
|---|---|---|---|
| 3,545,690 | 12/1970 | Burian et al. | 241/186 |
| 4,015,782 | 4/1977 | Granite | 241/62 |
| 4,119,277 | 10/1978 | Snyder et al. | 241/167 |
| 4,374,573 | 2/1983 | Rouse et al. | 241/DIG. 31 X |
| 4,607,800 | 8/1986 | Barclay | 241/159 |
| 4,684,071 | 8/1987 | Dicky | 241/80 |
| 4,927,088 | 5/1990 | Brewer | 241/223 |
| 5,562,255 | 10/1996 | Witko et al. | 241/158 |
| 5,601,240 | 2/1997 | Merklinger et al. | 241/101.74 |

Primary Examiner—John M. Husar
Attorney, Agent, or Firm—Beveridge, DeGrandi, Weilacher & Young LLP

[57] ABSTRACT

A waste tire pulverizing and separation machine including a machine body, and a roll-in mechanism, a pulverizing barrel, and a separation conveyer accommodated in the machine body. The roll-in mechanism is mounted at an input side at an upper side of the machine body and is comprised of an upper roller assembly and a lower roller assembly. Each roller assembly comprises a plurality of rollers arranged in a row. Each roller is provided with ratchet wheels and are driven to synchronously rotate by a motor via chains. The pulverizing barrel is mounted at a rear side of an output end of the roll-in mechanism. A circumferential surface of the pulverizing barrel is provided with a plurality of alternately arranged cutters. A curved sieve is located below the pulverizing barrel. The separation conveyer is disposed below the pulverizing barrel and comprised of a plurality of rollers mounted between two frames. An output roller at an output end of the separation conveyer is provided with a magnetic tape. The roll-in mechanism rolls a waste tire into the machine body, and the tire is pulverized by the pulverizing barrel. The thus pulverized tire is separated into rubber particles and metal filaments by means of the separation conveyer.

2 Claims, 8 Drawing Sheets

WASTE TIRE PULVERIZING AND SEPARATION APPARATUS

BACKGROUND OF THE INVENTION

1. Field of the Invention

The present invention relates generally to a waste tire pulverizing and separation machine, and more particularly to a waste tire pulverizing and separation machine which is compact in size and may separate waste tire into rubber particles and metal filaments.

2. Description of the Prior Art

The number of waste tires is considerable and tires themselves do not decompose. In the past, waste tires were disposed of by burning. But as the gas produced during burning tires would seriously pollute the environment, this method was no longer adopted. With the increasing number of waste tires each year, if they are not disposed of properly and allow them to accumulate, they will occupy extensive space and become breeding grounds of bacteria and germs. The best method is to recycle the waste tires so as to reduce the damage waste tires do to the environment.

In order to recycle waste tires, they firstly have to be cut into strips or pieces, or pulverized. R.O.C. Publication No. 264729 discloses a machine for cutting waste tires into strips. The machine essentially comprises a machine body, and a feeding device and a strip cutting device accommodated in the machine body. The feeding device includes two opposing rollers which may be rotated by an electrical device to feed tire strips into the machine body. The strip cutting device is comprised of a rotary shaft and a plurality of coaxial disk-like cutter mounts fixedly mounted on the rotary shaft. Each cutter mount is provided with a cutter locking portion for locking a strip cutter. The rotary shaft is driven by the electrical device to bring the strip cutters to rotate and cut waste tires into strips.

R.O.C. Publication No. 266502 teaches an apparatus for separating and removing metal filaments and nylon in waste tires. The apparatus essentially comprises a cutter, multiple step rollers; a magnetic selector, a pulverizing device, and a blowing selector. The cutter cuts the waste tire into pieces which are then pressed by the rollers into a mixture of finer pieces. Metal substances and non-metal substances in the waste tire are then separated. Then the magnetic selector will attract the metal substances from the mixture, and the pulverizing device will pulverize the metal substances thus separated from the mixture and separate nylon and rubber. Nylon and rubber are then separate by blowing using the blowing selector. This apparatus is comprised of several independent machines connected by conveyers. Each independent machine performs its job on its own. It can therefore be seen that the apparatus is a complicated structure. Besides, since the independent machines are connected by conveyers, the apparatus will occupy considerable floor space, which will increase recycling costs and hence reduce competitiveness.

SUMMARY OF THE INVENTION

A primary object of the present invention is to provide a waste tire pulverizing and separation machine which may pulverize waste tires and separate the pulverized tires into rubber particles and metal filaments, and which is compact in size so that costs may be reduced and competitiveness increased.

In order to accomplish the above object, the pulverizing and separation machine according to the present invention essentially comprises a machine body, and a roll-in mechanism, a pulverizing barrel, and a separation conveyer accommodated in the machine body. The roll-in mechanism is mounted at an input side at an upper side of the machine body and is comprised of an upper roller assembly and a lower roller assembly. Each roller assembly comprises a plurality of rollers arranged in a row. Each roller is provided with ratchet wheels and are driven to synchronously rotate by a motor via chains. The pulverizing barrel is mounted at a rear side of an output end of the roll-in mechanism. A circumferential surface of the pulverizing barrel is provided with a plurality of alternately arranged cutters. A curved sieve is located below the pulverizing barrel. The separation conveyer is disposed below the pulverizing barrel and comprised of a plurality of rollers mounted between two frames. An output roller at an output end of the separation conveyer is provided with a magnetic tape. The roll-in mechanism rolls a waste tire into the machine body, and the tire is pulverized by the pulverizing barrel. The thus pulverized tire is separated into rubber particles and metal filaments by means of the separation conveyer. As the components are housed in the machine body, the entire size of the machine is compact and occupies little space, thus lowering costs and increasing competitiveness.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
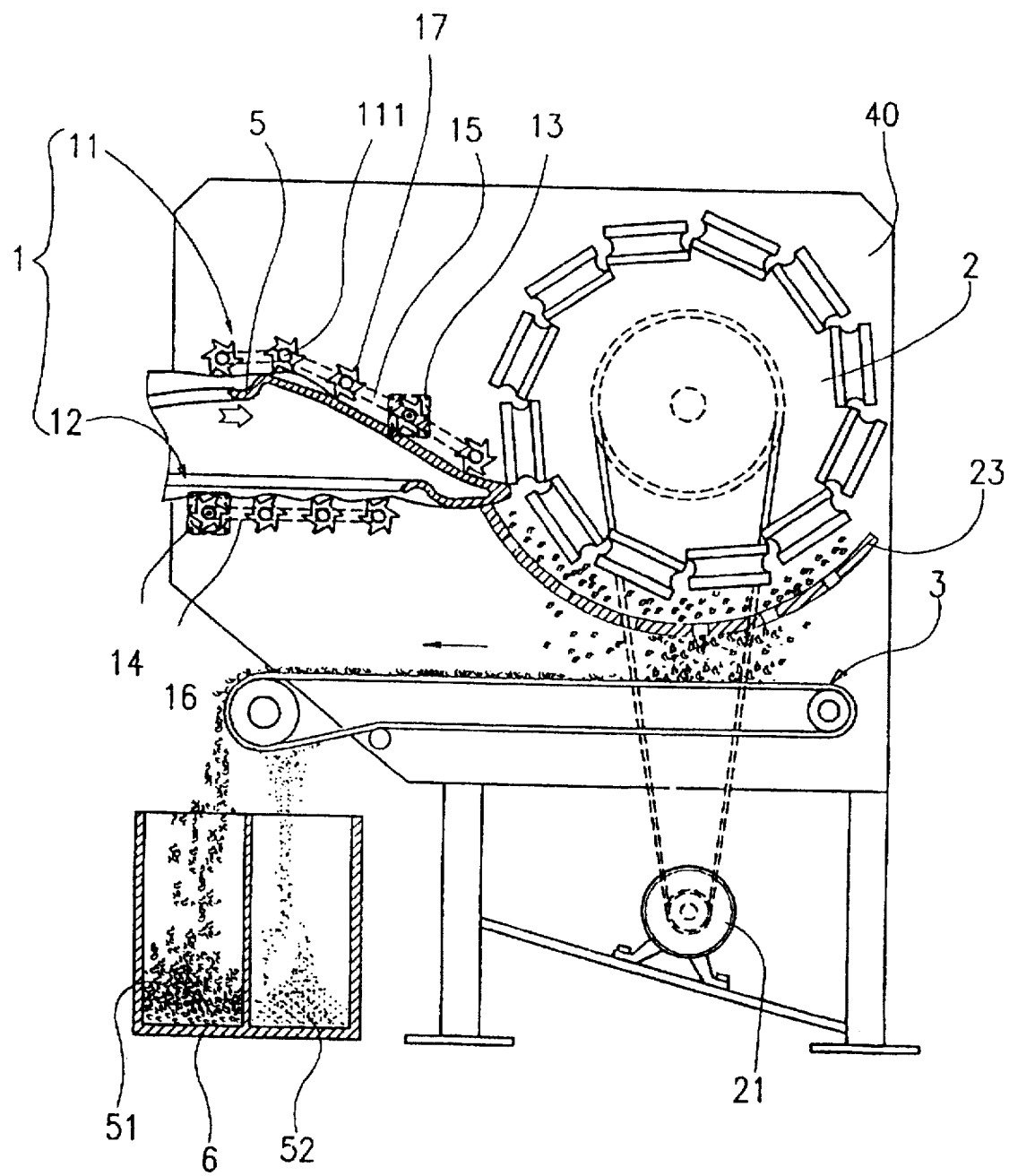
FIG. 1 is a sectional view of the present invention.

With reference to FIG. 1, the present invention essentially comprises a machine body 40, and a roll-in mechanism 1, a pulverizing barrel 2, and a separation conveyer 3 accommodated in the machine body 40. The structure and relative position of these components will be described in detail hereinbelow.

Figure 2:
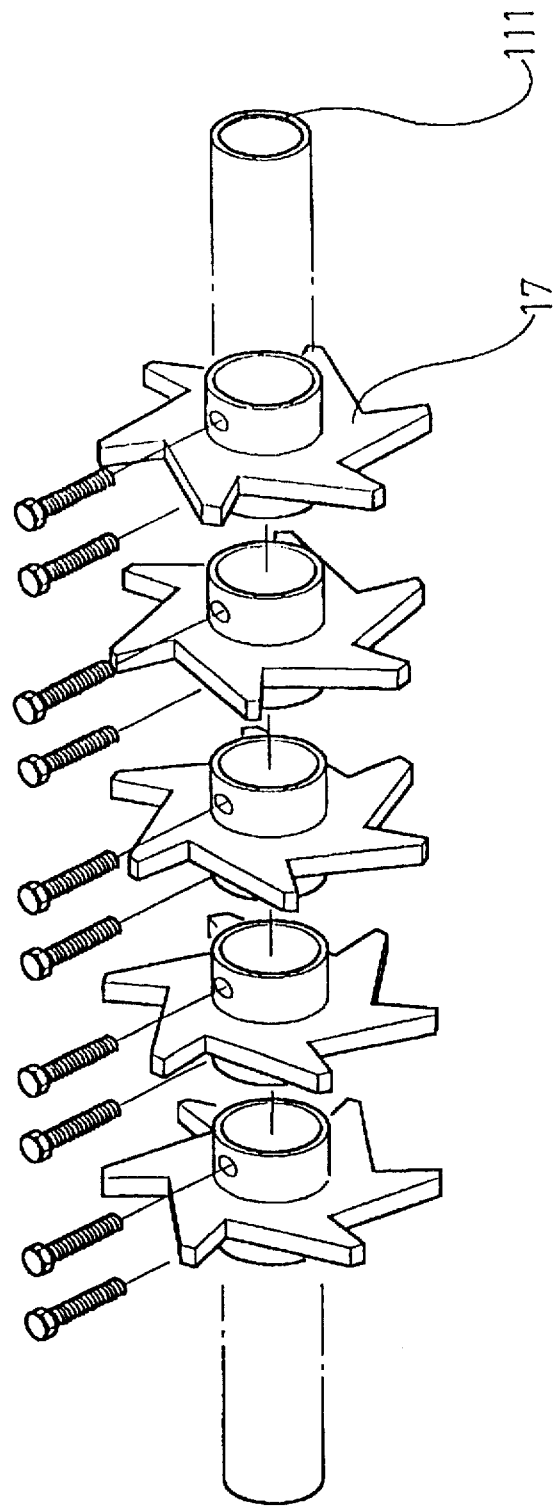
FIG. 2 is an assembled perspective view of a roller provided with ratchet wheels according to the present invention.
Figure 3:
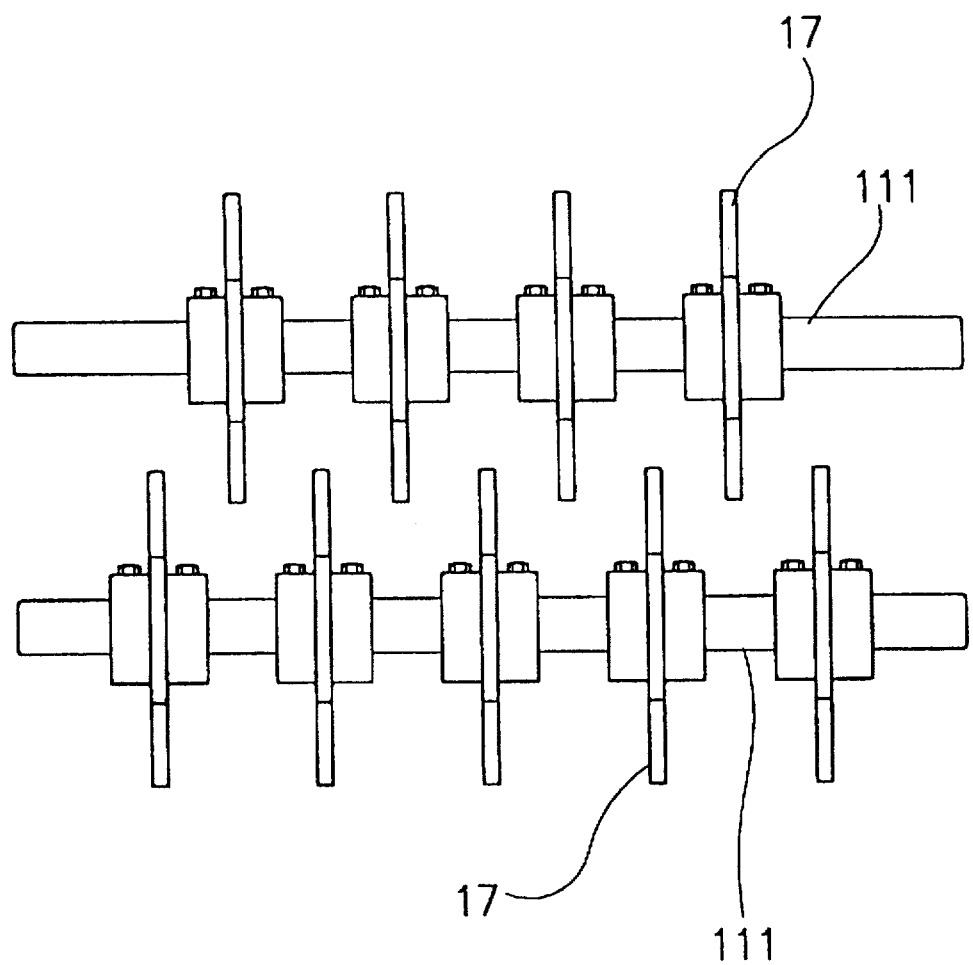
FIG. 3 is a schematic view illustrating the ratchet wheels of adjacent rollers in an alternate arrangement.

The roll-in mechanism 1 is mounted at an input side at an upper side of the machine body 40. The roll-in mechanism is comprised of an upper conveying roller assembly 11 and a lower conveying roller assembly 12. Each roller assembly in turn is comprised of a plurality of rollers 111 arranged in a series. The rollers 111 of the respective roller assemblies are individually caused to synchronously rotate with chains 15, 16 driven by motors 13, 14. Each roller 111 has mounted thereon a plurality of ratchet wheels 17, as shown in FIG. 2. The ratchet wheels 17 of adjacent rollers 111 are alternately arranged, as shown in FIG. 3.

Figure 4:
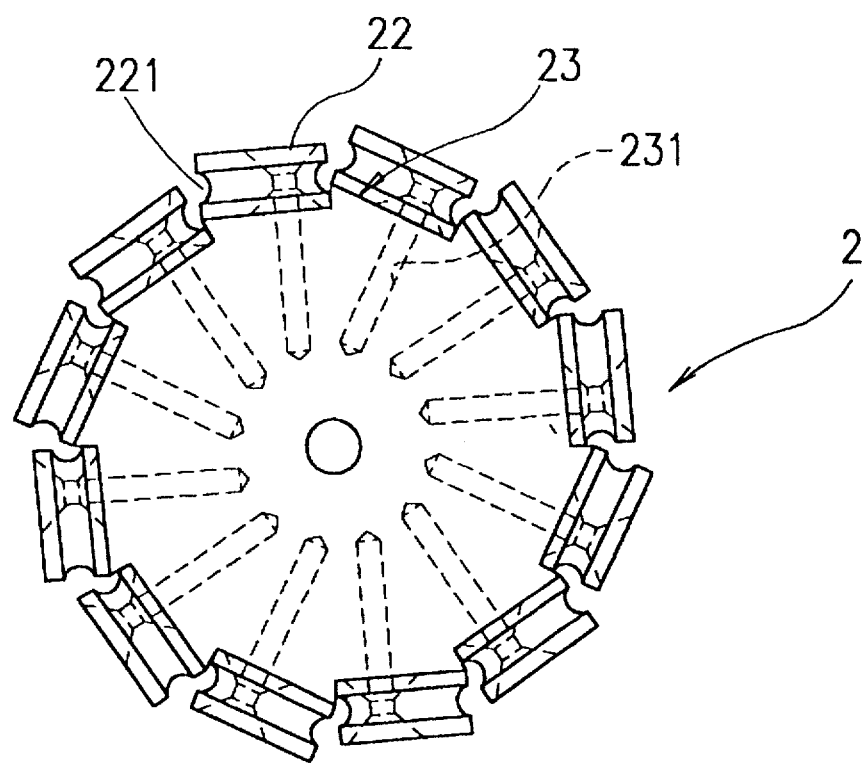
FIG. 4 is an end sectional view of the pulverizing barrel of the present invention.

The pulverizing barrel 2 is mounted at a rear end of an output end of the roll-in mechanism. The pulverizing barrel 2 is driven by a motor 21. A plurality of alternately arranged cutters 22 of mounted at the circumferential surface of the pulverizing barrel 2, as shown in FIG. 4. Besides, a curved sieve 23 is mounted below the pulverizing barrel 2.

Figure 5:
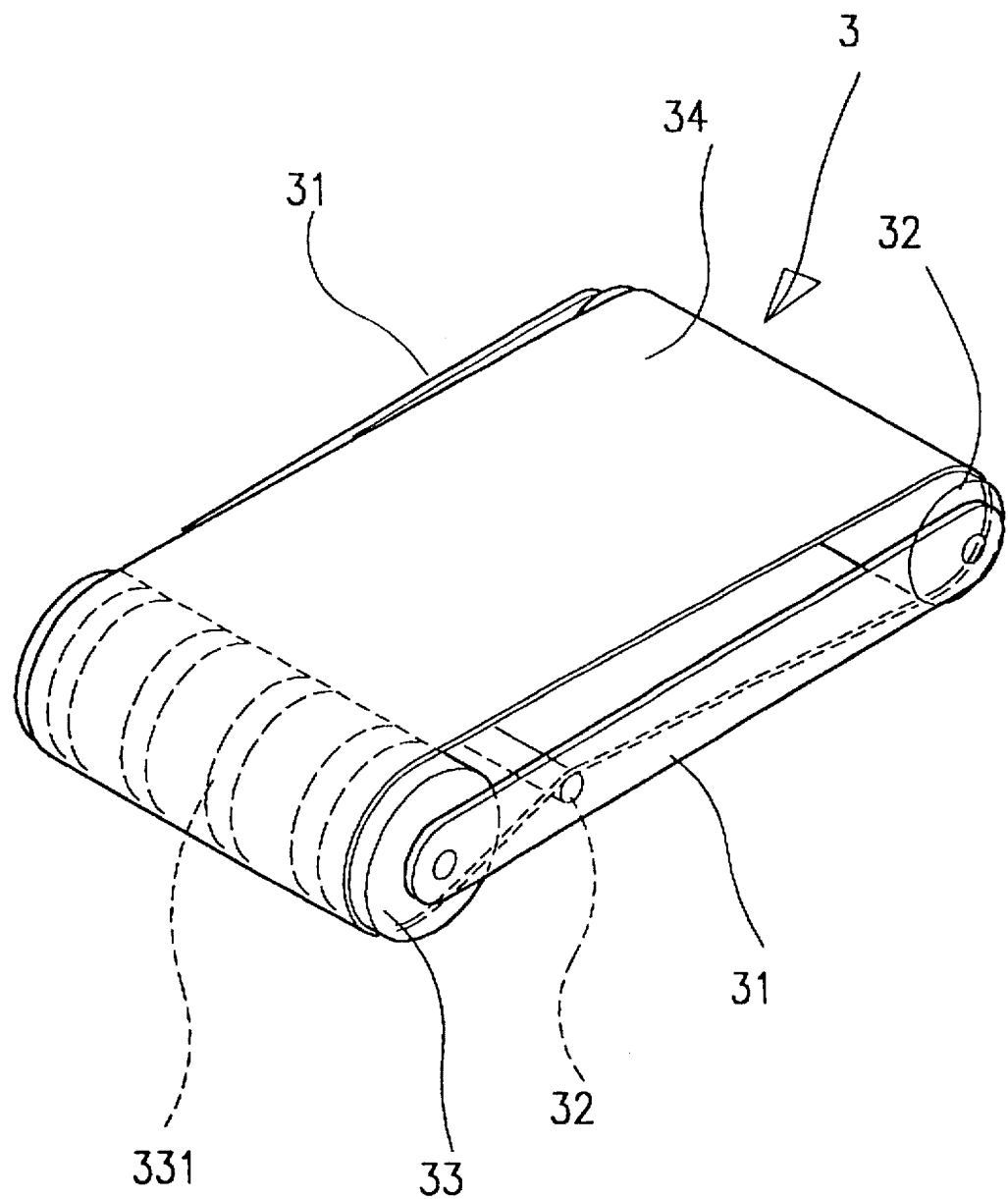
FIG. 5 is a perspective view of the separation conveyer of the present invention.
Figure 6:
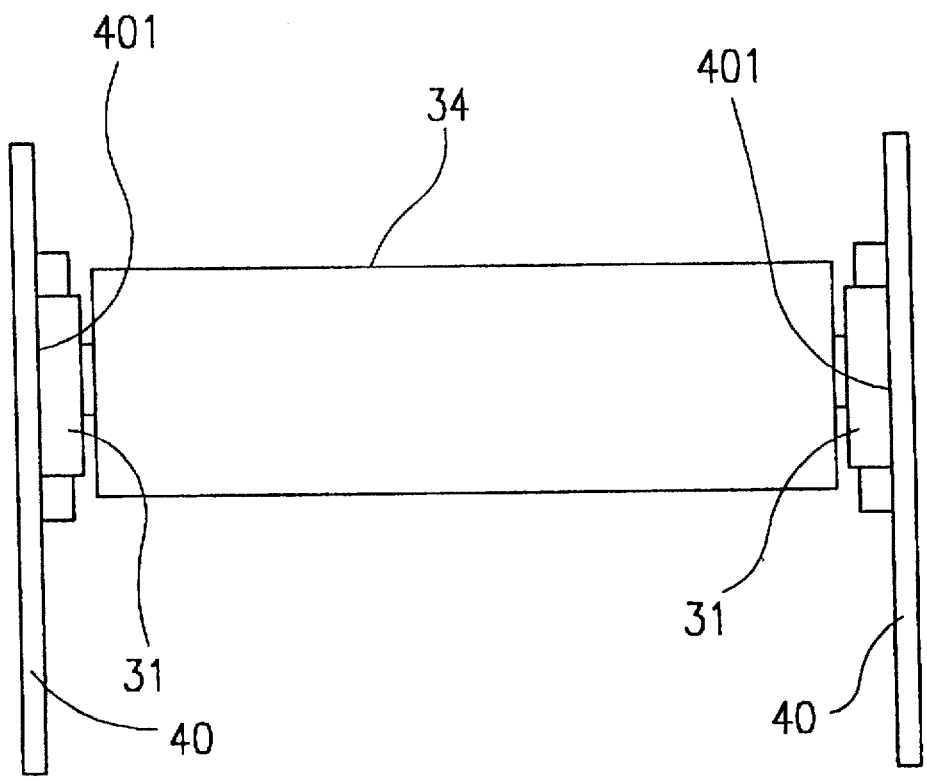
FIG. 6 is a side view of the separation conveyer mounted in the machine body of the present invention.

The separation conveyer 3 is mounted below the pulverizing barrel 2 and is comprised of two opposing frames 31, a plurality of rollers 32, 33 mounted between the frame 31, and a belt 34 around the rollers 32, 33. The roller 33 is an output roller having a magnetic tape 331 and is located at an output end of the separation conveyer 3, as shown in FIG. 5. Grooves 401 are respectively provided at opposing inner sides of the machine body 40 such that the frames 31 of the separation conveyer 3 may fit into the corresponding grooves 401, so that the separation conveyer 3 may be mounted in the machine body 40, as shown in FIG. 6.

In practice, a waste tire 5 is fed from the input side of the machine body 40 and is rolled into the machine body 40 by means of the roll-in mechanism 1. The tire 5 is then pulverized by the pulverizing barrel 2, which may pulverize the tire 5 into rubber particles 51 and metal filaments 52 to be transferred out of the machine body 40 by the separation conveyer 3. Since the output roller 33 at the output end of the separation conveyer 3 is provided with a magnetic tape 331, the metal filaments in the pulverized tire 5 are attracted to the magnetic tape 331. Therefore, when the pulverized tire 5 is transported to a rear end of the separation conveyer 3, the rubber particles 51 that are not attracted by the magnetic tape 441 will directly drop into a first space of a collecting tank 6 below the machine body 40. As for the metal filaments 52, because they are attracted to the magnetic tape 331 of the output roller 33, when they are removed by the belt 34 from the output roller 33, the metal filaments will drop into a second space of the collecting tank 6. Hence, the rubber particles and the metal filaments of the tire 5 may be separately collected.

Furthermore, since the rollers 11 of the roll-in mechanism 1 are provided with ratchet wheels 17 and the series of ratchet wheels 17 of adjacent rollers 11 are alternately arranged, and since the the upper roller assembly 11 and the lower roller assembly 12 advance in the same direction, when the upper and lower roller assemblies 11, 12 are actuated, the ratchet wheels 17 on the rollers 111 may force the waste tire 5 into the machine body 40 and press it hard, so that the pulverizing barrel 2 may pulverize the waste tire 5 into particles.

As the curved sieve 23 is located below the pulverizing barrel 2, when the tire 5 is being pulverized, larger scraps that cannot pass through the mesh holes of the curved sieve 23 will remain in the space between the pulverizing barrel 2 and the curved sieve 23 until they are pulverized to a suitable size that may pass through the curved sieve 3.

In addition, since the separation conveyer 3 is mounted by means of the frames 31 at both sides thereof inserted into the corresponding grooves 401 of the machine body 40, if the separation conveyer 3 needs repairs or maintenance, it may be easily removed from the machine body 40. Besides, assembly of the separation conveyer 3 to the machine body 40 is convenient.

Figure 7:
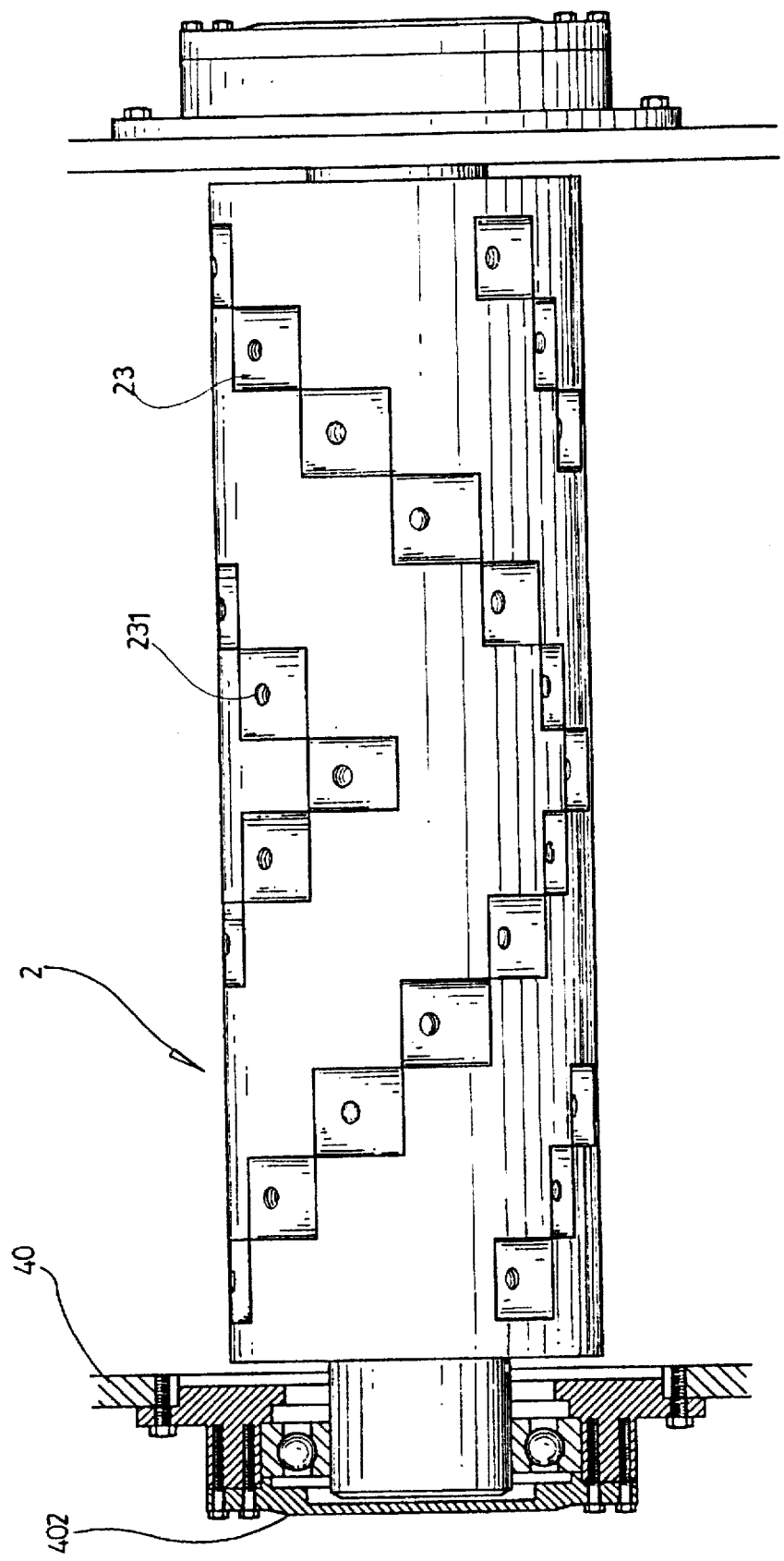
FIG. 7 is a sectional view of the pulverizing barrel of the present invention.

Referring to FIG. 7, the pulverizing barrel 2 has two ends pivotally mounted on pivot seats 402 at both sides of the machine body 40 respectively, and the diameter of ends are the same. Since the pulverizing barrel 2 has a relatively large diameter and longer length, if the machine body 40 is placed at a corner of the factory, the pulverizing barrel 2 may be pulled out from the end where the available space is larger for replacement of the cutters 22 or maintenance.

Since the roll-in mechanism 1, pulverizing barrel 2, separation conveyer 3 are mounted within the machine body 40 to constitute a single machine unit, the pulverizing and separation machine of the invention is compact and does not occupy space when installed in the factory.

Figure 8:
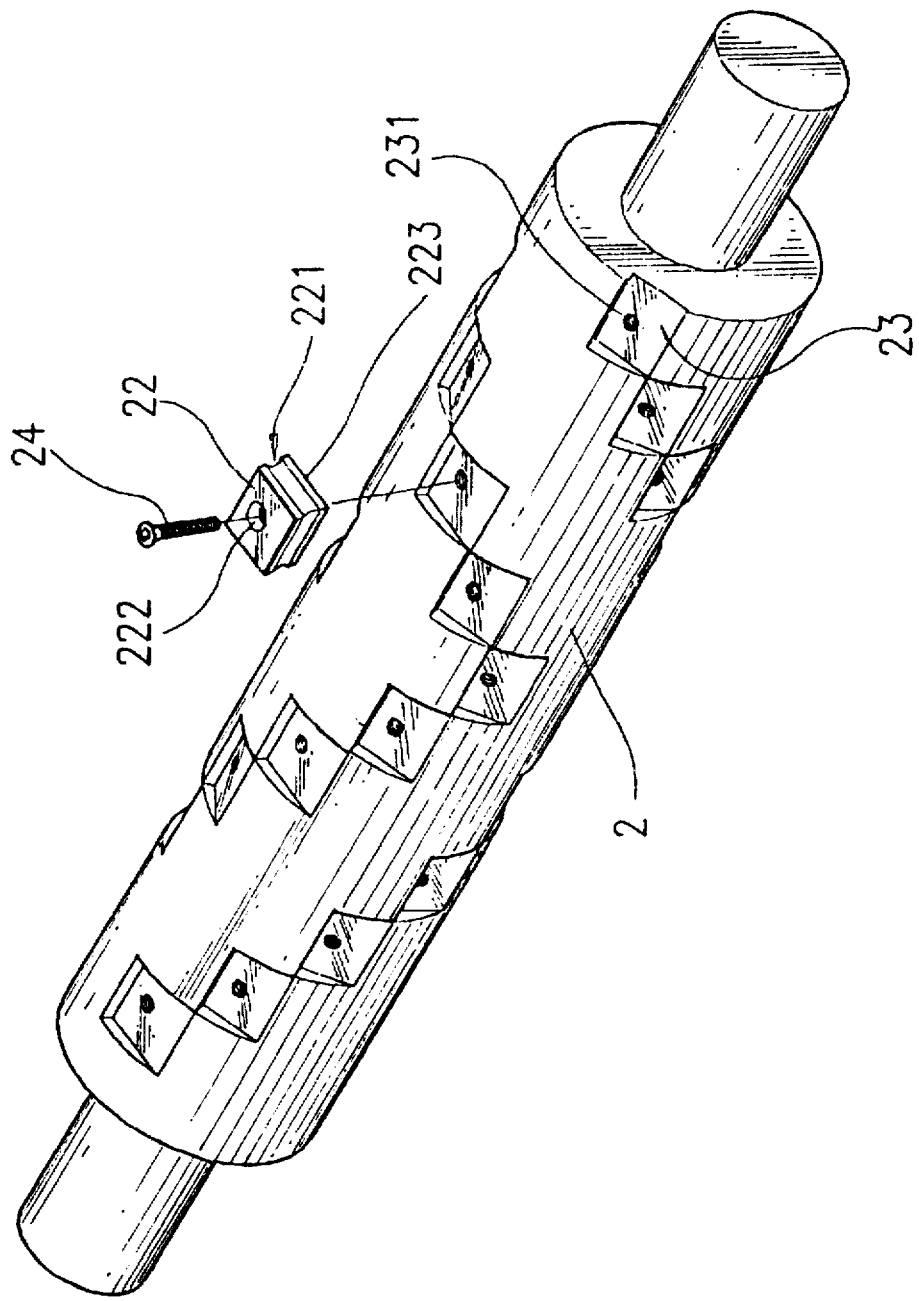
FIG. 8 is a perspective view of the pulverizing barrel of the present invention in part.

Referring to FIGS. 4 and 8, the circumferential surface of the pulverizing barrel 2 is provided with a plurality of alternately arranged square cutter mounting recesses 23 which incline inwardly from the circumferential surface of the pulverizing barrel 2. Each cutter mounting recess 23 is provided with a threaded hole 231. Each cutter 22 is a flat, square structure, with a curved groove 221 formed on its peripheral surface. Each cutter 22 is further provided with a circular hole 222 through which a screw bolt 24 may pass and into the screw hole 231 of the cutter mounting recess 23 to lock the cutter 22 in the cutter mounting recess 23 of the pulverizing barrel 2.

The cutters 22 are flat, square structures, with eight cutting edges 223. When any one of the cutting edges 223 becomes blunt through use, the position of the cutter may be adjusted so as to utilize a sharp one of the cutting edges 223. In this way, all the cutting edges of the cutter may be fully utilized. As each cutter 22 is provided with a peripheral curved groove 221, the peripheral curved groove 221 may serve as a scrap removing portion. Hence, the cut tire particles may be smoothly discharged during cutting, and besides the cutting power and damage to the cutters 22 may be reduced.

Although the present invention has been illustrated and described with reference to the preferred embodiment thereof, it should be understood that it is in no way limited to the details of such embodiment but is capable of numerous modifications within the scope of the appended claims.

What is claimed is:

1. A waste tire pulverizing and separation machine, comprising a machine body, and a roll-in mechanism, a pulverizing barrel, and a separation conveyer mounted in said machine body, wherein said roll-in mechanism is mounted at an input side at an upper side of said machine body, said roll-in mechanism comprising an upper roller assembly and a lower roller assembly, said upper roller assembly and said lower roller assembly respectively comprising a plurality of rollers arranged in a row, said rollers being driven via respective chains by a motor so that they may synchronously rotate; each of said rollers being provided with a plurality of ratchet wheels such that said ratchet wheels of adjacent rollers are alternately arranged;

said pulverizing barrel is mounted at a rear side of an output end of said roll-in mechanism and is driven by a motor, said pulverizing barrel having a plurality of cutters that are alternately arranged on a circumferential surface thereof, and a curved sieve being disposed below said pulverizing barrel; and said separation conveyer is mounted below said pulverizing barrel and comprises two frames at both sides, a plurality of rollers mounted between said frames, and a belt running around said rollers; one of said rollers being an output roller located at an output end of said separation conveyer and provided with a magnetic tape.

2. A waste tire pulverizing and separation machine as claimed in claim 1, wherein said pulverizing barrel has a plurality of square cutter mounting recesses on a circumferential surface thereof, said cutter mounting recesses being alternately arranged and inclining towards the circumferential surface of said pulverizing barrel, each of said cutter mounting recesses further having a screw hole; each of said cutter mounting recesses having a screw hole; and said cutters are each a flat, square structure having a curved groove around a periphery thereof, said cutters each further having a circular hole for insertion of a screw bolt therethrough and into the corresponding screw hole of said cutter mounting recess so that said cutters may be mounted in said cutter mounting recesses on said pulverizing barrel.

* * * * *